Patented May 10, 1938

2,116,986

UNITED STATES PATENT OFFICE 2,116,986

PHONOGRAPH RECORD

Harold F. Stose, Haddonfield, N. J., assignor to Radio Corporation of America, New York, N. Y., a corporation of Delaware No Drawing. Application November 30, 1932, Serial No. 645,091

4 Claims. (Cl. 106—1.5)

My invention relates to phonograph records and, more particularly, to a composition of matter particularly adapted for use in the manufacture of such records.

In my copending application, Serial No. 645,090, filed Nov. 30, 1932, I have disclosed and claimed a thermoplastic synthetic resin which is especially fit for use in phonograph records and which consists essentially of polymerized vinyl compounds. Records made primarily of this material possess, among other qualifications, those of being thin, light in weight, tough and durable, flexible, resilient, and free from attack by moisture and air.

As is well known in the resin record industry, commercial records are pressed from resins while they are in a plastic form. In order to control the consistency of the mass, and, incidentally, to impart to the resins sufficient wear resistance as well as to reduce the cost of the finished records, various fillers are incorporated in the resin. The most common (and perhaps standard) fillers employed are iron-silica clays. Fillers of this type, however, are not only unsatisfactory because of the relatively high surface noise in the finished record for which they are largely responsible, but also because of their low resin absorption characteristics. That is to say, fillers of this type have the property of absorbing only a relatively small amount of resin, and for this reason, a comparatively great amount of filler is required in order to control the consistency of the plastic resin mixture through only a comparatively small range. It is apparent, therefore, that since the ratio of filler content to resin content is high, the surface noise is necessarily also high. Obviously, a resinous material from which the foregoing difficulties are removed would be highly desirable, and accordingly, it is the primary object of my invention to provide an improved resinous composition for use in the manufacture of phonograph records which is satisfactorily bodied by means of fillers but which will be free from the disadvantages present in bodied resins of the prior art.

Another object of my invention is to provide an improved resinous composition for use in the manufacture of phonograph records which will be characterized by a minimum of surface noise.

Still another object of my invention is to provide an improved resinous composition for use in the manufacture of phonograph records, the consistency of which can be easily and satisfactorily controlled.

And a further object of my invention is to provide an improved resinous composition of the type disclosed in my above identified copending application which will be economical in cost as well as manufacture, which readily lends itself to processing, such as working, blanking and pressing, and which produces a record that has good characteristics.

In accordance with my invention, I incorporate into the resin a very highly absorptive filler in place of the low absorptive fillers employed in the prior art. Hence, for a given amount of resin, I need employ only a far smaller amount of filler than was heretofore necessary in order to provide the same consistency. This not only affords better consistency control, but also minimizes surface noise in the finished record and greatly reduces the cost thereof.

One particular class of low absorptive fillers which I have used advantageously is diatomaceous earths. These earths comprise skeletons of diatoms and other minute sea animals and are practically pure silica rendered very fine in texture by natural processes. The particles of these earths, in addition to being very fine, are also very porous, which accounts for their relatively great power to absorb the resins. In this respect, they are, therefore, different from pure silica which has been ground very fine by mechanical means and which has a very low absorption, therefore providing a poor record from the point of view of surface noise.

For the purpose of comparison, and as illustrative of the difference in the ratio of filler content to resin content between two typical resins of the type disclosed in my above noted copending application, in one of which I employ iron oxide-silica filler and in the other of which I employ a diatomaceous earth filler, I cite the following:

|      |                          | Parts by weight |
|------|--------------------------|-----------------|
| I    | Vinyl resin              | 342             |
|      | Carnauba wax             | 18              |
|      | Hard cumar               | 120             |
|      | Iron oxide-silica filler | 1000            |
| II   | Vinyl resin              | 500             |
|      | Carnauba wax             | 7½              |
|      | Diatomaceous earth       | 200             |
|      | Carbon black             | 10              |

A comparison of the above formulae shows that whereas the ratio of filler content to resin content necessary in a record according to Formula I is 1000:342, or about 3:1, the ratio of filler to resin is only 200:500, or 2:5, in the case of the record bodied with the diatomaceous earth. Reducing the two ratios to common terms, we have, in the former case, a ratio of approximately 15:5, and in the latter, a ratio of only 2:5. I believe, therefore, that the advantages of using a filler in accordance with my invention will be readily apparent.

Although I have described a certain specific embodiment of my invention, I am aware that many modifications thereof are possible. For example, the invention may be applied to many resins other than those specifically mentioned herein, including natural resins, and the diatomaceous earth may be replaced by any other suitable filler, it being only essential that the filler employed be highly resin absorptive. Also, if desired, a substantial quantity of abrasive filler may be incorporated along with the highly resin-absorptive filler, the former being characterized by its low absorptive property, while the latter is characterized by its low abrasive property. By "a substantial quantity of abrasive filler", I mean any quantity which will produce an appreciable change in the properties of the resinous composition if incorporated therein.

Furthermore, although I have cited, for illustration, a formula wherein the ratio of filler to resin is 2:5, it is to be understood that this ratio is not limiting, but may be varied within wide limits. In my experiments, I have used filler and resin in the proportions of from 5 parts of filler and 100 parts of resin to 100 parts of filler and 100 parts of resin. Within this range, I have found that best results may be obtained when the ratio of filler to resin lies between the limits of 7:20 and 13:20, a ratio in the neighborhood of 10:20, or 1:2, being preferred. My invention, therefore, is not to be restricted, except insofar as is necessitated by the prior art and by the spirit of the appended claims.

I claim as my invention

1. A phonograph record composed essentially of a polymerized vinyl resin having a filler of diatomaceous earth incorporated therein.

2. A phonograph record according to claim 1 wherein the ratio of filler to resin is between the limits of 7:20 and 13:20.

3. A phonograph record according to claim 1 wherein the ratio of filler to resin is approximately 1:2.

4. A phonograph record composed essentially of a vinyl resin and a filler of diatomaceous earth incorporated therein to provide a highly resin absorptive filler for said resin, said record also containing a substantial quantity of a filler which has a relatively lower affinity for the resin than does diatomaceous earth, and said second named filler having a higher abrasive property than the diatomaceous earth.

HAROLD F. STOSE.